United States Patent
Becker et al.

(10) Patent No.: US 7,578,863 B2
(45) Date of Patent: Aug. 25, 2009

(54) MULTI-STAGE APPARATUS FOR SEPARATING LIQUID DROPLETS FROM GASES

(75) Inventors: Stefan Becker, Speyer (DE); Carsten Schippers, Roemerberg (DE); Wolfgang Heikamp, Waldsee (DE); Tobias Neumann, Kuhardt (DE); Jens Gutekunst, Dudenhofen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 11/783,739

(22) Filed: Apr. 11, 2007

(65) Prior Publication Data

US 2007/0240391 A1 Oct. 18, 2007

(30) Foreign Application Priority Data

Apr. 12, 2006 (DE) .................. 20 2006 006 085 U

(51) Int. Cl.
*B01D 46/00* (2006.01)
*B01D 39/00* (2006.01)
*B01D 50/00* (2006.01)
*B01D 19/00* (2006.01)

(52) U.S. Cl. .............................. 55/495; 55/319; 55/423; 96/189

(58) Field of Classification Search .................. 55/319, 55/423, 495; 96/189
See application file for complete search history.

(56) References Cited

U.S. PATENT DOCUMENTS

| 3,876,401 | A | * | 4/1975 | Sturgill ........................ 55/481 |
| 5,676,717 | A | * | 10/1997 | Cope et al. .................... 55/321 |
| 5,746,791 | A | * | 5/1998 | Wang ........................... 55/337 |
| 5,899,667 | A | * | 5/1999 | Greer ........................... 417/53 |
| 6,136,076 | A | * | 10/2000 | Read ........................... 96/189 |
| 6,409,804 | B1 | | 6/2002 | Cook et al. |
| 6,499,965 | B2 | * | 12/2002 | Cook et al. ................. 417/313 |
| 7,056,362 | B2 | * | 6/2006 | Fallows et al. ................ 55/360 |
| 7,332,009 | B2 | * | 2/2008 | Casey et al. ................... 55/423 |

FOREIGN PATENT DOCUMENTS

| DE | 34 45 400 A1 | 6/1986 |
| DE | 198 27 297 A1 | 12/1999 |
| EP | 0 806 564 A1 | 11/1997 |
| EP | 1 229 248 A2 | 8/2002 |

OTHER PUBLICATIONS

European Search Report dated Jul. 20, 2007 with English translation of relevant portions (seven (7) pages).

* cited by examiner

*Primary Examiner*—Walter D Griffin
*Assistant Examiner*—Amber Orlando
(74) *Attorney, Agent, or Firm*—Crowell & Moring LLP

(57) ABSTRACT

An oil/air separator in which a drainage line is connected to an outlet in the interior of a vessel, e.g., a pressure vessel, upon installation of the oil/air separator in the vessel.

12 Claims, 6 Drawing Sheets

MULTI-STAGE APPARATUS FOR SEPARATING LIQUID DROPLETS FROM GASES

BACKGROUND OF THE INVENTION

This invention relates to a device for separating droplets of liquid from gases, in particular an oil separator for air. Separators for removing liquid droplets from gases are used, for example, for separating water and/or oil from air. Separators of this type are used in particular for removing oil from air in compressors.

Liquid droplets may accumulate in a stream of gas as it comes in contact with liquids. The liquid droplets may be entrained mechanically, e.g., as the gas flows through the liquid or when the stream of gas is passed over a liquid. In screw compressors, for example, air comes in contact with oil. The oil is used for sealing, cooling and lubricating the compressor. Liquid droplets may also be formed in a gas stream by condensation, e.g., liquid droplets are formed by condensation in a stream of vapor. Temperatures of approximately 200° C. may occur in the production of compressed air. Due to these temperatures, a portion of the oil that is supplied in the case of a screw compressor, for example, may evaporate. The oil vapor then condenses to form droplets and mist in subsequent cooling. The oil droplets of a screw compressor have a diameter on the order of approximately 0.01 µm to 100 µm.

Droplet separators are used for separating liquid droplets from gases. Droplet separators are capable of separating a liquid phase from a gaseous phase. Droplet separators may be used for cleaning exhaust air streams. With droplet separators, entrained liquid droplets can be separated from process gas flows. Corrosion or erosion of installation parts or caking or deposits on installation parts may be reduced by such separation. By reusing separated media the consumption of operating media can be reduced. Droplet separators are used, for example, for removing oil from compressed air.

Droplet separators may be constructed as inertial separators. In inertial separators, the inertia of the droplets is utilized to separate the droplets on walls. Inertial separators are suitable especially for larger droplets, usually with a droplet diameter of more than approximately 20 µm. A baffle plate is a simple form of droplet separator. With a baffle plate, a gas stream loaded with liquid droplets is directed at a plate, so that the gas stream undergoes a change in direction. Due to inertia, the droplets contained in the gas stream retain their direction, strike the plate and are diverted there. Another type of inertial separation makes use of centrifugal forces. In centrifugal separators, the gas stream is guided along a curved path. Due to the centrifugal forces, the droplets are guided on an outer path having the largest possible radius of curvature. Therefore, the droplets are concentrated in this outer area. The droplets may then be deposited on a wall along the outer area of the gas flow, for example. The droplets can then be diverted from the wall. Alternatively, it is also possible to remove only gas from the interior area of the gas stream having a low droplet concentration. Various types of cyclones, for example, may be used as centrifugal separators.

Droplet separators may be designed as a drainage element. With a drainage element, a gas stream loaded with liquid droplets is passed through a mesh-like and/or porous drainage structure. For example, a woven wire mesh or a nonwoven fleece, e.g., made of synthetic resin or glass fibers, may be used as the drainage structure. Droplets pass through the drainage structure more slowly than does the gas stream. Due to gravity, the droplets move toward the geodetically lower region of the drainage structure, collect there and can be removed.

The larger the droplets entrained in the gas stream are, the more efficient inertial separation is. Coalescing elements are used to increase droplet size. In coalescing elements the gas stream is passed through a mesh and/or porous coalescing structure. A woven wire mesh or a nonwoven fleece, e.g., made of plastic or glass fibers, may be used as the coalescing structure. The gas stream follows the flow lines. The droplets cannot follow the flow lines and remain adhering to the boundary surfaces of the coalescing structure. A liquid film forms on the coalescing structure. Small droplets combine to form larger droplets, i.e., they coalesce. The enlarged droplets leave the coalescing structure. Coalescing elements may also have a drainage effect. The droplets form the liquid film on the coalescing structure, move toward the geodetically lower region and can be drained out there. Therefore, a combined coalescing and drainage element may be designed. The larger droplets, which are therefore heavier, leaving the coalescing structure, fall in the gas stream and can also be removed from the gas stream in this way.

Depending on the field of use, persons skilled in the art will be aware of various combinations of drainage and coalescing elements as well as inertial separators for separating liquids from gases. The system described below is known for removing oil from compressed air from compressors. In a pressure vessel, a cylindrical flow baffle is introduced at the upper end. The cylinder formed by the flow baffle is open at the bottom toward the interior of the pressure vessel. The compressed air enters tangentially between the flow baffle and the pressure vessel wall, resulting in preliminary separation of oil on the wall of the pressure vessel while the separated oil is conveyed back into the compressor. Compressed air flows from beneath into the oil separator for air which is situated inside the cylinder formed by the flow baffle. The oil/air separator comprises one or more coalescing and/or drainage stages, e.g., a coalescing structure made of borosilicate glass fibers and a drainage structure made of polyester nonwoven fleece. The nonwoven fleece made of borosilicate glass fibers and the polyester nonwoven fleece are each applied to a supporting body made of metal. The flow passes through the oil/air separator from the outside to the inside. Small droplets of liquid are combined in the coalescing structure to form larger droplets, and some of them already settle out in the coalescing structure. Larger droplets leaving the coalescing structure fall further in the drainage structure and collect at the bottom of the oil/air separator. The oil at the bottom of the oil/air separator is conveyed back to the compressor device through a drainage line. The compressed air from which the oil has been removed is conveyed from the pressure vessel into a pressure storage vessel. The oil/air separator is mounted in the pressure vessel on an upper cover of the pressure vessel. The drainage line is passed through the upper cover or is connected to the upper cover. The separated oil is returned to the compressor device through a line from the passage through or connection to the upper cover.

One disadvantage of the system described here for separating oil from air, such as that used with screw compressors, is that connections for the drainage line and/or other lines for returning the oil to the compressor must be present on the upper cover. These lines are usually disconnected when changing the oil/air separator. There is the risk of damage to lines and/or gaskets. There is the possibility of leakage occurring during the assembly work. Changing the oil/air separator is made difficult.

SUMMARY OF THE INVENTION

The object of the present invention is therefore to simplify the assembly of a device for separating liquids from gases, in particular an oil/air separator, in a vessel, in particular a pressure vessel, e.g., a screw compressor.

Another object of the invention is to provide a device for separating liquids from gases that will allow assembly of the upper cover of a pressure vessel without having to disconnect the connections in an oil return line.

These objects as well as others are achieved by providing a device for separating liquids from gases in which a drainage line is connected to an outlet of the vessel on installation of the device in a vessel, e.g., a pressure vessel, whereby the outlet is mounted on the vessel. Due to the fact that the outlet is mounted on the vessel, the lines may remain on the vessel when changing the device.

The drainage line can be welded to, integrally molded onto or manufactured in one piece with the support tube. The drainage line may also be inserted into a tubular receptacle of the support tube or clipped to the support tube. Due to the different fastening options, optimized production of the device for separating liquids from gases can be achieved.

The oil/air separator advantageously includes positioning devices which determine the installation position of the oil/air separator in a pressure vessel. The positioning devices are preferably designed to be self-finding.

The connection of the drainage line to the pressure vessel may advantageously take place at the location of a positioning device.

The sealing of the drainage line may be achieved by a gasket that acts axially. If the drainage line is perpendicular to the pressure vessel at the coupling point, then an axial pressure is exerted on the gasket in the radial direction of a typically cylindrical pressure vessel. The pressure can be caused, for example, by applying tension to the oil/air separator in the pressure vessel on the side opposite the coupling point at a position mark.

These and other features of preferred embodiments of the invention are set forth not only in the claims, but also in the specification and drawings, and the individual features may be embodied individually or several may be combined in the form of subcombinations in embodiments of the invention and in other fields of use, and these may constitute advantageous and independently patentable constructions for which patent protection is hereby claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1A:
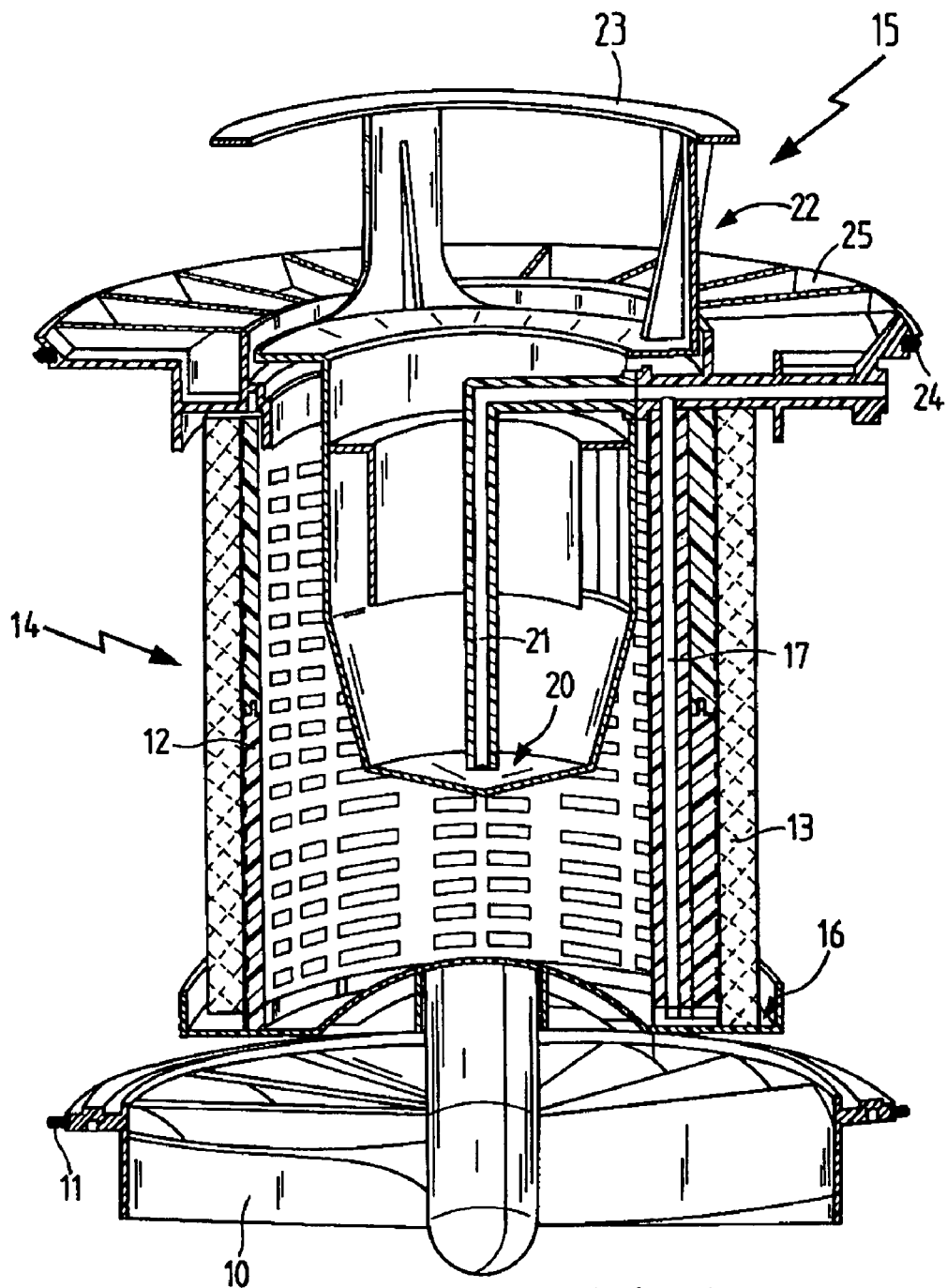
FIG. 1a shows a device for separating liquids from gases which can be used for separating oil from air in an air compression system comprising a screw compressor.
Figure 4:
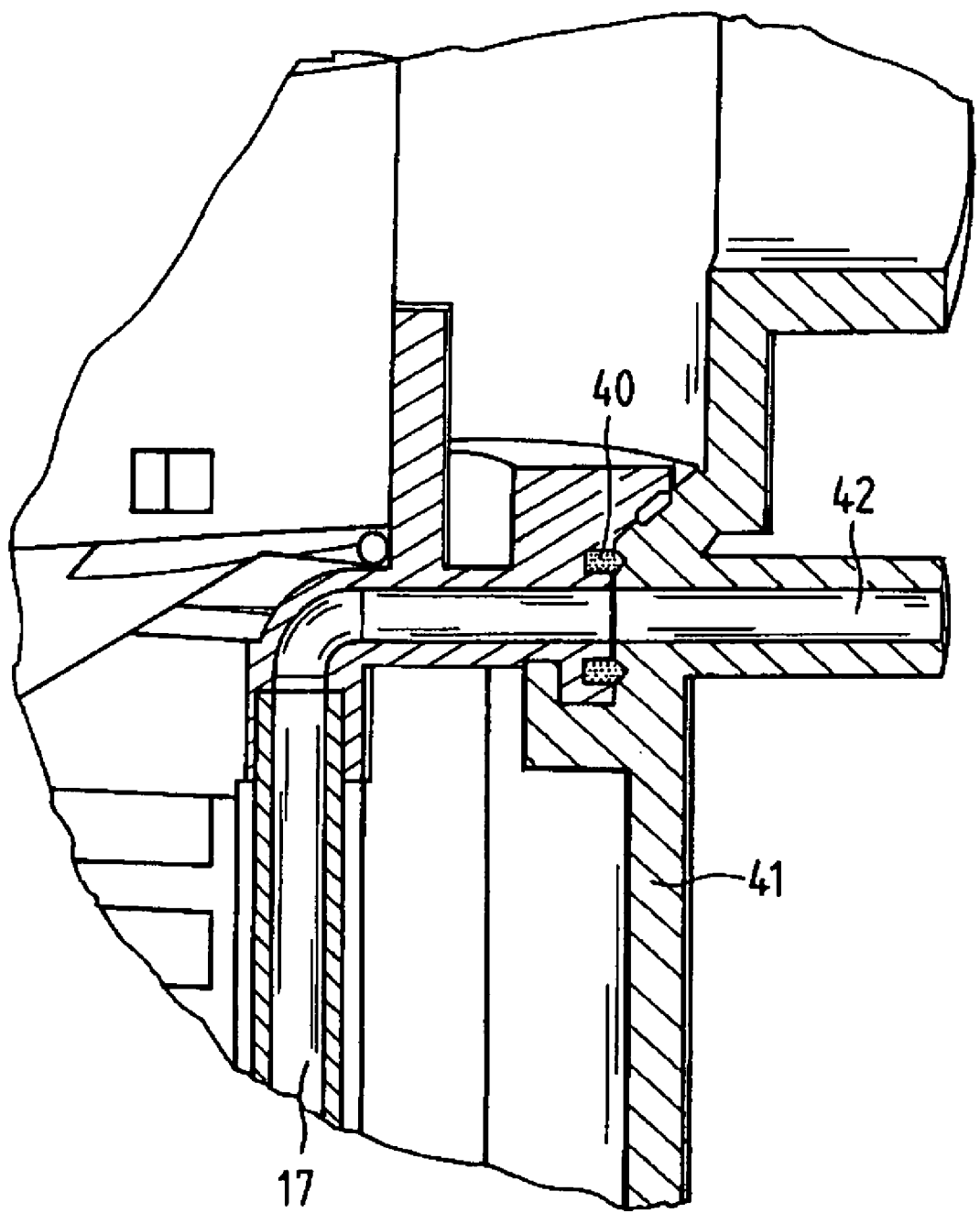
FIG. 4 shows another embodiment of the invention.

In an air compression system with a screw compressor, approximately 5 kg oil/m$^3$ air is supplied when generating compressed air in the screw compressor. The oil serves to lubricate and seal the compressor. In a traditional air compression system which serves to provide so-called oil-free compressed air, i.e., the compressed air is to be supplied with an oil content of approximately 1 to 3 mg/m$^3$ air, the oil must be removed from oil-laden compressed air. In a traditional air compression system, preliminary separation takes place in a pressure vessel. The preliminary separation is accomplished by tangential inflow of oil-laden air into the pressure vessel. The air then flows around a cylindrical insert in the pressure vessel in which an oil/air separator is installed for further separation of the oil. Due to the tangential admission and deposition of oil on the pressure vessel wall as a baffle, a reduction of the oil concentration in the compressed air arriving at the oil/air separator to approximately 2 to 5 g/m$^3$ air can be achieved in the pressure vessel. The separated oil is sent back to the compressor. In the embodiments of the invention depicted in FIGS. 1a and b, the oil-laden air can then flow into the pressure vessel at will. In the pressure vessel, the oil-laden air flows from beneath through the diffuser of an inline cyclone that serves as a preliminary separator 10. The diffuser of preliminary separator 10 forms a seal against the pressure vessel wall with the gasket 11 which leaves a gap open or encompasses openings, and thus the diffuser separates the pressure vessel into a raw air area and a preliminary separator area, whereby oil can flow back from the preliminary separator area into the raw air area on the wall of the pressure vessel. Alternatively, the oil may also flow back through the diffuser of the preliminary separator 10. Due to a preliminary separator designed in this way, the oil concentration can be reduced to less than 0.5 g/m$^3$ air. Due to the lower oil concentration in comparison with traditional system for removing oil from air, this yields freedom for the design of the main separator 14 and/or the secondary separator 15 because they need achieve only lower degrees of separation. The air flows from the preliminary separation area through a main separator, which is designed as a coalescing structure in the embodiment in FIG. 1a in the form of a nonwoven 13 made of borosilicate glass fibers applied to a support tube 12. As it flows through the nonwoven 13, smaller droplets combine to form larger droplets, while at the same time the droplets settle out in the coalescing structure. The settling droplets collect in a first trough 16 together with large droplets which emerge from the coalescing structure and fall downward geodetically in the gas stream in the interior of the support tube 12. The separated oil is recycled from the trough 16 through a drainage line 17. The first drainage line 17 is welded to the support tube 12 in FIGS. 1a and b. The air stream flowing out of the main separator 14 to the secondary separator 15 then contains essentially larger oil droplets that can be separated in the secondary separator 15. In the embodiment shown in FIGS. 1a and b, a reverse cyclone 18 is used for the secondary separation. In the reverse cyclone the air is set in rotation, so that the oil droplets are separated on the wall 19 of the reverse cyclone 18. The oil droplets slide down the wall 19 of the reverse cyclone 18 into the second trough 20 and are returned from the second trough 20 back to the compressor via a second drainage line 21. The second drainage line 21 is linked to the first drainage line 17 in the embodiment shown in FIGS. 1*a* and *b*, but it could also run separately. The secondary separator 15 includes a spacer 22 with a fastening ring mounted at its upper end. The device for separation of liquids from gases can be fastened in the pressure vessel with this fastening ring 23. A separation plate 25 mounted at the upper end of the main separator 14 forms a seal with respect to the pressure vessel with gasket 24. The separation plate 25 separates the preliminary separator gas zone from the oil from which the air has been removed and which is leaving the secondary separator 15. The drainage line 17 is guided in its upper area on a side connection. On installation of the device in a pressure vessel, an O-ring 40 (shown in FIG. 4) seals the drainage line 17 with respect to the vessel wall 41. A throughbore 42 to which an oil return line can be attached is provided in the vessel wall.

Figure 1B:
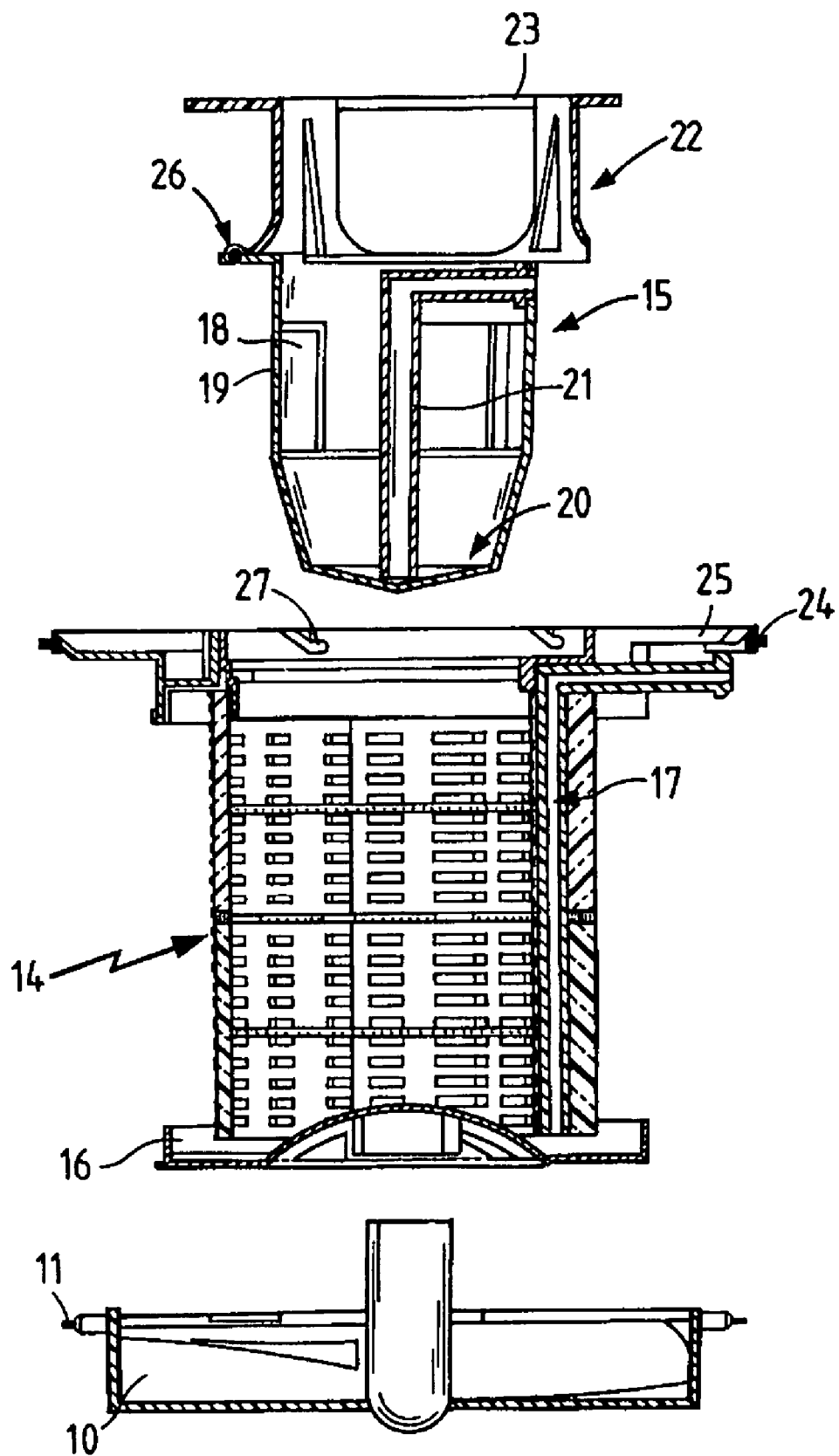
FIG. 1b shows the device from FIG. 1a, illustrating the device broken down into a plurality of components.

FIG. 1*b* shows the modular design of the device for separation of liquids from gases. The preliminary separator 10, which is designed as an inline cyclone, the main separator 14 and the secondary separator 15 are designed as modules. The modules may be joined together using a bayonet connection, for example. Pins 26 and receptacles 27 for the pins 26 are shown for connecting the secondary separator 15 to the main separator 14. Other plug, catch or screw connections are of course also conceivable. Likewise, the modules could be welded together. The individual modules in FIG. 1*b* may all be made of plastic, in particular fiberglass-reinforced polyamide [nylon]. The first drainage line 17 may be mounted on the support tube by vibration welding, ultrasonic welding or butt welding. The required gaskets 11 or additional gaskets may be integrally molded or introduced into grooves as O-ring gaskets. Due to the modular design, various elements for a module may be interchanged. For example, instead of the reverse cyclone 18, a spiral cyclone or a second inline cyclone may also be used. Main separators of different heights having different areas of the coalescing structure may be used. If the preliminary separator, main separator and secondary separator modules are separably joined together, then it is possible to exchange just a single group during maintenance. For example, the inline cyclone of preliminary separator 10 and the secondary separator 15 may be designed as lifetime components and then only the main separator 14 having the nonwoven 13 is replaced.

Figure 2:
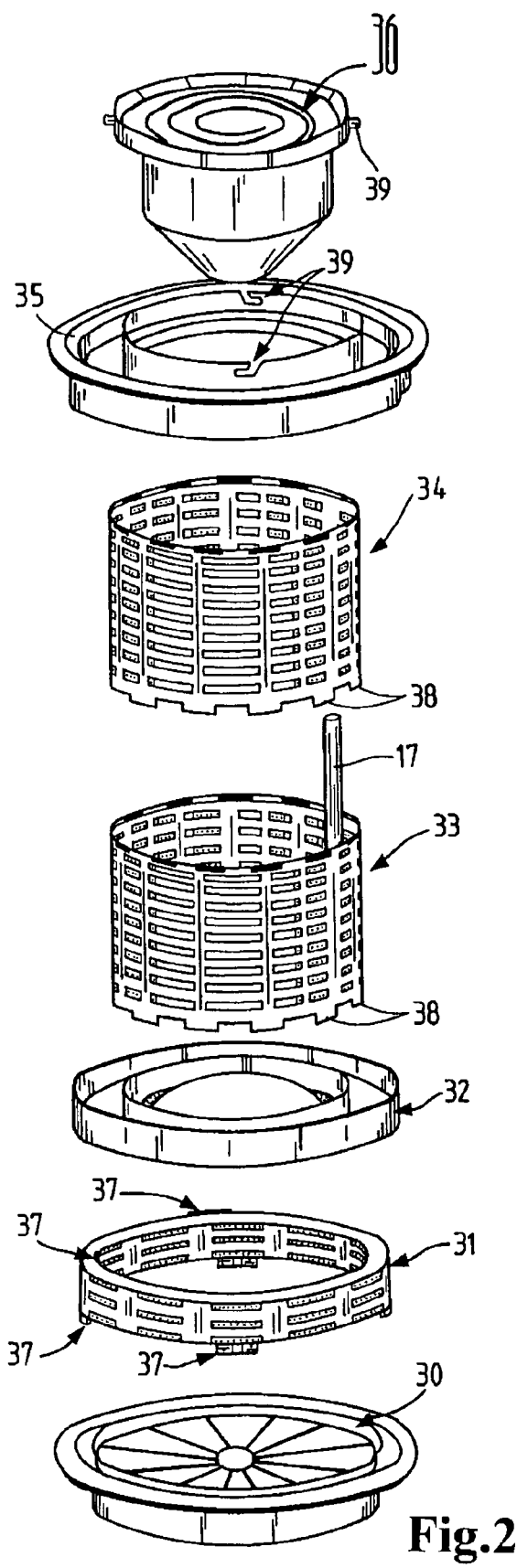
FIG. 2 shows an alternative device for separating liquids from gases such as that which can be used for separating oil from air in an air compression system having a screw compressor, with a main separator that can be assembled from multiple support tubes.

FIG. 2 shows an embodiment of the device for separating liquids from gases, with a main separator that can be assembled from multiple support tubes, broken down here into its individual parts. In the embodiment in FIG. 2, an inline cyclone 30 serves as the preliminary separator. The inline cyclone 30 may be separably connected to an oil-collecting trough 32 via a spacer 31 with catch connections 37. The oil-collecting trough 32 may be connected to a first support tube 33 by plug connections 38. A second support tube 34 having the same design as the first support tube 33 may be attached to the first support tube 33 with plug connectors 38. Other additional support tubes (not shown) could also be added. In the schematic diagram in FIG. 2, the nonwoven surrounding the support tube is not shown. The closing piece 35 may in turn be disposed on the second support tube 34 via a plug connection (not shown). A spiral cyclone 36 may be inserted into the closing piece 35 as a secondary separator. In the embodiment in FIG. 2, the spiral cyclone 36 is separably mounted on the closing piece 35 with a bayonet connection 39. The first drainage line 17 may also be clipped on the assembled support tubes 33, 34.

Figure 3A:
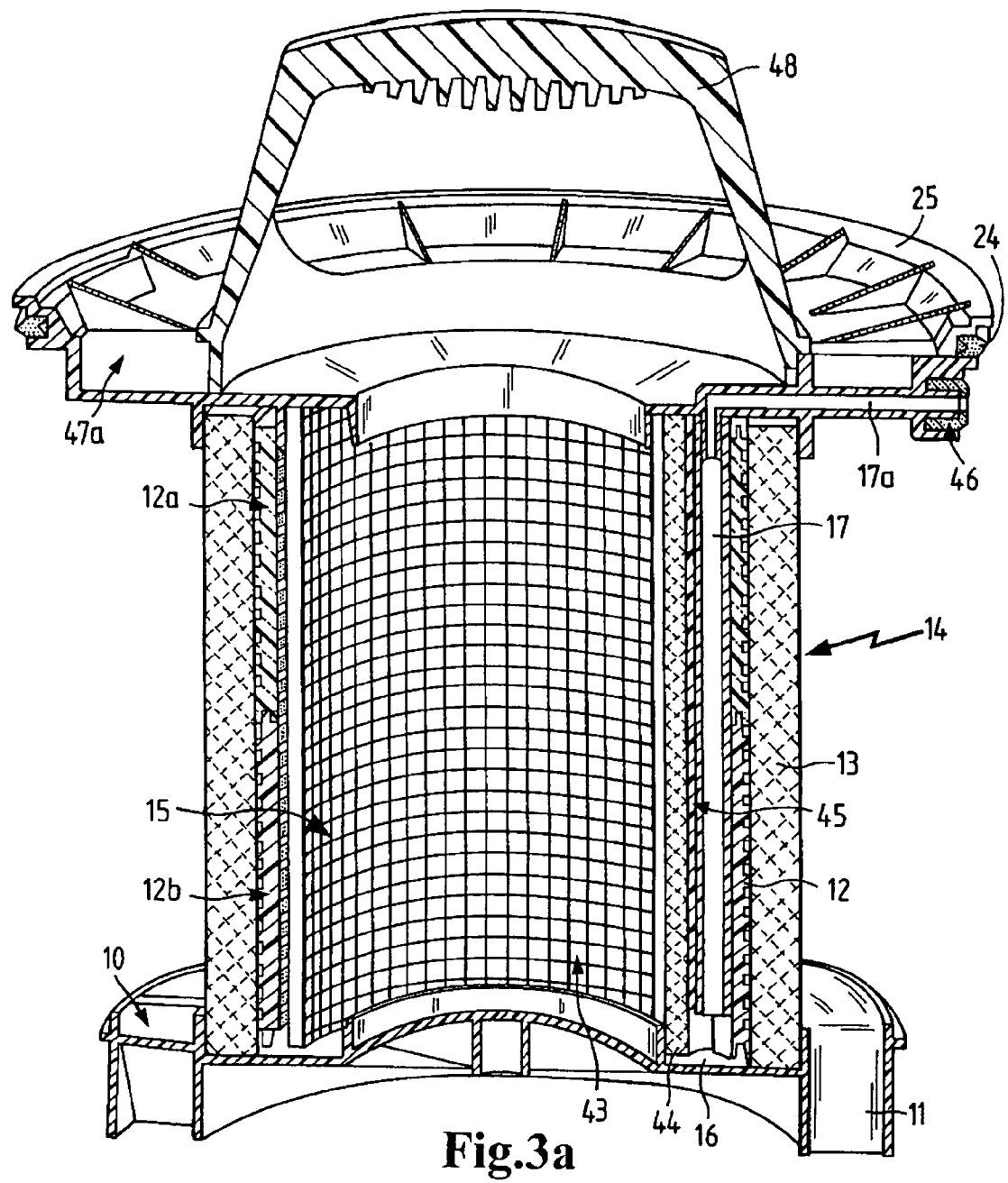
FIGS. 3a and 3b show another preferred embodiment of a coupling of a drainage pipe to a pressure vessel.

The oil/air separator in FIG. 3*a* is a preferred embodiment of the invention. An impeller 10 above made of plastic, e.g., fiberglass-reinforced polyamide, is used as the preliminary separator. As in FIGS. 1*a* and *b*, the main separator 14 is designed as a coalescing element. A nonwoven 13 is wound onto a first supporting body 12 and glued there. The first supporting body 12 is assembled from two modules 12*a* and 12*b*; the two modules 12*a* and 12*b* may be identical. The secondary separator 15 is designed as a drainage element in the embodiment according to FIG. 3*a*. A drainage nonwoven 44, e.g., made of polyamide or glass fibers, is wrapped around a second supporting body 43. The oil separated by the main separator 14 and the secondary separator 15 collects in a trough 16. A receptacle 45 for a drainage line 17 is attached to the first support tube 12. The receptacle 45 is designed as a pipe section integrally molded on each module 12*a* and *b* of the supporting body 12. The drainage line 17 is inserted into the receptacle 45. The drainage line 17 is connected to a drainage line section 17*a*. The drainage line section 17*a* is connected to a pressure vessel outlet on insertion of the oil/air separator into the pressure vessel with a gasket 46. The first supporting body 12 and the second supporting body 43 are connected at the geodetically higher end to an end disk that acts as a separation plate 25 to divide the pressure vessel. With a ring gasket 24 on the pressure vessel, the separation plate 25 forms a seal. A handle 48 is provided on the separation plate 25; it may be removable or in another embodiment of the invention, in the installed state of the oil/air separator it may secure the oil/air separator in the pressure vessel. The conically shaped positioning mark 47*a* can be inserted into a correspondingly shaped counterpart on the pressure vessel. Due to the conical shaping of the positioning mark 47*a* it is self-binding and the oil/air separator automatically slips into the correct position during installation even if it is not positioned completely correctly. Other embodiments, e.g., in which convex and concave shapes oppose one another on the pressure vessel and the oil/air separator accordingly so that one can slip into the other, are also possible, e.g., circular attachments. The positioning mark 47*a* may also be designed so that it builds up tension in the oil/air separator causing the gasket 46 to be pressed axially.

Figure 3B:
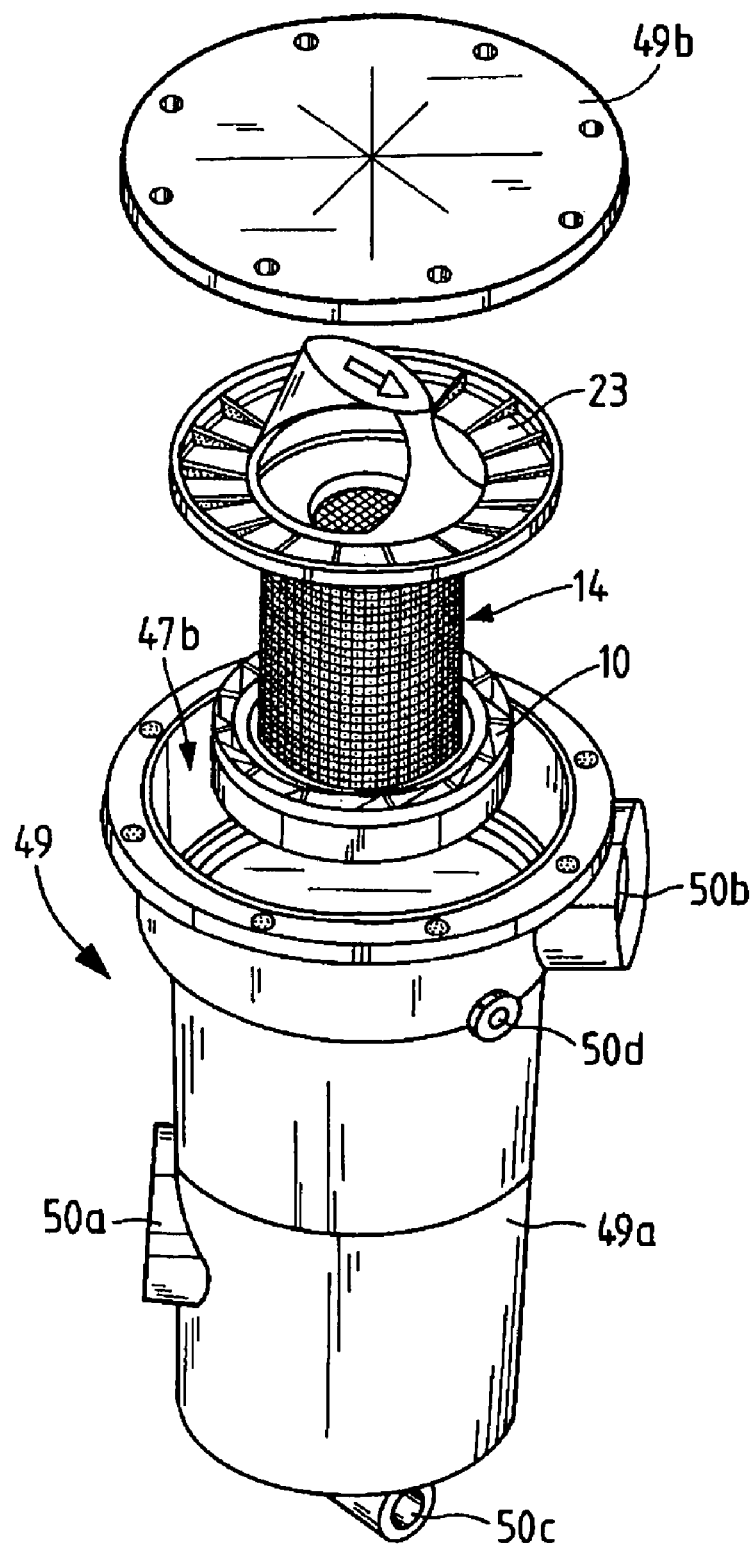

FIG. 3*b* shows the installation of the oil/air separator from FIG. 3*a* in a pressure vessel 49. The pressure vessel 49 comprises a cover 49*b* and a body 49*a*. The pressure vessel is preferably made of steel. The pressure vessel 49 comprises air inlets 50*a* and air outlets 50*b*. On its lower end geodetically, the pressure vessel comprises an oil outlet 50*c* and another oil outlet 50*d* that connects to the drainage line 17. A recess 47*b* corresponding to a positioning mark 47*a* on pressure vessel 49 allows the installation of the oil/air separator in only one position. The oil/air separator can be inserted into the pressure vessel 49 and the cover 49*b* can be screwed onto the body 49*a* without having to open lines on the pressure vessel 49.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An oil/air separator installed in a pressure vessel in which a drainage line for separated oil is connected to an outlet in the interior of the vessel upon installation of the oil/air separator in the vessel, said drainage line extending radially from said oil/air separator to connect to said outlet of said pressure vessel, wherein a gasket is provided between said drainage line and said outlet of said pressure vessel; said gasket forming a seal by applying pressure in a radial direction relative to said pressure vessel, and wherein said oil/air separator is configured and adapted to permit said oil/air separator to be swapped out and replaced with a new separator in said pressure vessel without disconnecting external lines.

2. An oil/air separator as claimed in claim 1, wherein the oil air separator is connected to a compressed air outlet of an air compressor.

3. An oil/air separator as claimed in claim 1, wherein the oil/air separator drainage line and the pressure vessel outlet are connected in the radial direction.

4. An oil/air separator as claimed in claim 1, wherein the oil/air separator comprises at least one first positioning device that correspond to a like number of second positioning devices on the pressure vessel.

5. An oil/air separator as claimed in claim 4, wherein the corresponding positioning devices are constructed to be self-locating.

6. An oil/air separator as claimed in claim 5, wherein at least one first positioning device and at least one corresponding second positioning device are constructed differently, so that the oil/air separator can only be installed in the pressure vessel in a single installed position.

7. An oil/air separator as claimed in claim 4, wherein the oil/air separator is connected to the pressure vessel at the location of a first positioning device.

8. An oil/air separator as claimed in claim 7, wherein a tensioning positioning device is mounted on the opposite side of the connection positioning device on the oil/air separator, wherein mechanical stress is built up between a first pressure vessel side, the tension positioning device, the oil/air separator, the connection positioning device, the gasket and a second pressure vessel side in the installed oil/air separator, thereby pressing the gasket axially.

9. An oil/air separator as claimed in claim 1, wherein said gasket is an O-ring.

10. An air compression system comprising an air compressor and an oil/air separator as claimed in claim 1.

11. The oil/air separator as claimed in claim 4, wherein said first positioning device is conically shaped and configured to be received into and bind into the correspondingly shaped second positioning device of said pressure vessel, wherein said positioning devices are configured to automatically slip said oil/air separator into a singular correct position in said pressure vessel during installation.

12. The oil/air separator as claimed in claim 11, wherein said first positioning device is configured to engage said second positioning device such that said engagement builds up tension to compress said gasket in a radial direction.

* * * * *